United States Patent [19]

Hokari

[11] Patent Number: 5,414,760
[45] Date of Patent: May 9, 1995

[54] EXCHANGE FOR AN ISDN CAPABLE OF CONTROLLING AN INCOMING CALL BY KINDS OF COMMUNICATION

[75] Inventor: Makoto Hokari, Tokyo, Japan

[73] Assignee: NEC Corporation, Tokyo, Japan

[21] Appl. No.: 216,128

[22] Filed: Mar. 22, 1994

Related U.S. Application Data

[63] Continuation of Ser. No. 853,185, Mar. 18, 1992, abandoned.

[30] Foreign Application Priority Data

Mar. 18, 1991 [JP] Japan .................... 3-052014

[51] Int. Cl.⁶ ........................................... H04M 11/00
[52] U.S. Cl. .......................................... 379/93; 379/94; 379/100
[58] Field of Search ................. 379/93, 96, 97, 98, 379/94, 100; 370/110.1; 358/440, 434, 468

[56] References Cited

U.S. PATENT DOCUMENTS

| | | | |
|---|---|---|---|
| 4,998,248 | 5/1991 | Matsuzaki | 379/100 |
| 5,046,189 | 9/1991 | Kainuma | 379/100 |
| 5,134,611 | 7/1992 | Steinka et al. | 370/110.1 |
| 5,142,525 | 8/1992 | Nakatsuma | 379/93 |

Primary Examiner—Curtis Kuntz
Assistant Examiner—Jason Chan
Attorney, Agent, or Firm—Sughrue, Mion, Zinn, Macpeak & Seas

[57] ABSTRACT

For controlling an incoming call transmitted from an integrated services digital network towards a terminal unit, an exchange comprises a memory for memorizing address data representative of slave addresses which are assigned to the incoming call. In accordance with the incoming call and the address data, a local signal producing circuit produces a local signal for use in making a control portion of the exchange control the incoming call. When the incoming call includes a kind datum representative of a kind of the terminal unit, such as speech, facsimile, and/or data processing units, the control portion controls the incoming call in accordance with the kind datum and the address data. Likewise, the incoming call may include a channel datum and a number datum.

5 Claims, 5 Drawing Sheets

FIG. 5

| CH | |
|---|---|
| CH 0 | 2000 |
| CH 1 | 2001 |
| CH 2 | 2002 |
| CH 3 | 2003 |
| CH 4 | 2004 |
| CH 5 | 2005 |
| CH 6 | 2006 |
| CH 7 | 2007 |
| CH 8 | 2008 |
| CH 9 | 2009 |
| CH 10 | 2010 |
| CH 11 | 2011 |
| CH 12 | 2012 |
| CH 13 | 2013 |
| CH 14 | 2014 |
| CH 15 | 2015 |
| CH 16 | 2016 |
| CH 17 | 2017 |
| CH 18 | 2018 |
| CH 19 | 2019 |
| CH 20 | 2020 |
| CH 21 | 2021 |
| CH 22 | 2022 |

EXCHANGE FOR AN ISDN CAPABLE OF CONTROLLING AN INCOMING CALL BY KINDS OF COMMUNICATION

This is a continuation of application Ser. No. 07/853,185, filed Mar. 18, 1992, now abandoned.

BACKGROUND OF THE INVENTION

This invention relates to an exchange for an integrated services digital network (ISDN).

Generally, the exchange is connected through private or public lines to an integrated services digital network which includes a plurality of terminal units, such as a speech unit, a facsimile unit, and a data processing unit. An incoming call is sent from the integrated services digital network to the exchange through a particular one of the public lines. In the manner known in the art, particular ones of the terminal units are preassigned to the incoming call in a system which is generally called a direct in line (DIL) system or a direct in termination (DIT) system.

The integrated services digital network carries out various kinds of communication, for example, speech communication, data communication, and packet communication. The kind of communication is represented by bearer capability in the integrated services digital network. The communication can be carried out through a single one of the public lines. Accordingly, it is preferable that the exchange should automatically distribute the incoming call to the particular terminal unit by or in relation to the kind of communication.

A conventional exchange comprises a control portion for controlling the incoming call. During the daytime, the control portion may select, as a first selected terminal unit, one of the particular terminal units. Receiving the incoming call through the particular line, the exchange seeds the incoming call to the first selected terminal unit.

At night, the control portion may select, as a second selected terminal unit, another of the particular terminal units. Receiving the incoming call through the particular line, the exchange sends the incoming call to the second selected terminal unit.

It is, however, impossible in the conventional exchange to distribute the incoming call to the particular terminal units in relation to the kinds of communication. In other words, the conventional exchange carries out its operation regardless of the kind of the communication.

SUMMARY OF THE INVENTION

It is therefore an object of this invention to provide an exchange which is for use in an integrated services digital network and which is capable of controlling an incoming call in relation to the kind of communication and relation to a combination of kinds of communication and a calling party.

It is another object of this invention to provide an exchange which is of the type described and in which the incoming call is distributed among a plurality of terminal units in relation to the kind of communication.

Other objects of this invention will become clear as the description proceeds.

According to this invention, there is provided an exchange between an integrated services digital network and a plurality of terminal units. The exchange includes a control portion for controlling an incoming call transmitted from the integrated services digital network towards a particular one of the terminal units. The incoming call includes a message data representative of a message and on additional datum added to the message datum. The exchange comprises a primary memory for memorizing address data representative of slave addresses which are assigned to the incoming call, local signal producing means connected to the control portion and the primary memory for producing a local signal in accordance with the additional datum and the address data, and making means connected to the local signal producing means and the control portion for making the control portion control the incoming call in accordance with the local signal so that the incoming call is directed to the particular one of the terminal units.

BRIEF DESCRIPTION OF THE DRAWINGS

FIG. 5 shows a part of a trunk number memory area in the exchange illustrated in FIG. 1.

DESCRIPTION OF THE PREFERRED EMBODIMENT

Figure 1:
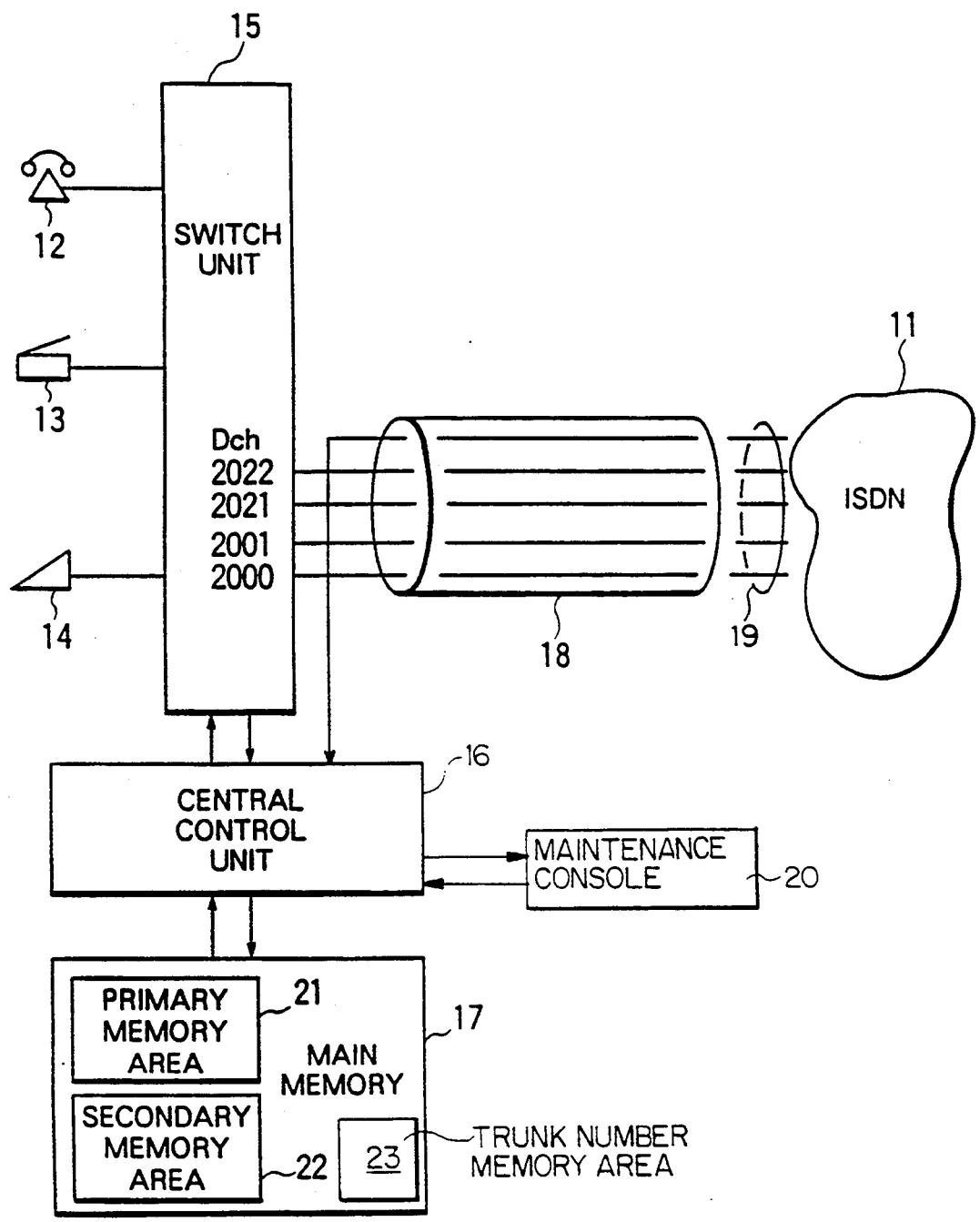
FIG. 1 shows, together with an integrated services digital network and a plurality of terminal units, a schematic diagram of an exchange according to an embodiment of this invention.

Referring to FIG. 1, description will be made as regards a communication system including an exchange according to an embodiment of this invention. In the manner known in the art, the communication system comprises an integrated services digital network (ISDN) 11 and a plurality of terminal units, such as a speech unit 12, a facsimile unit 13, and a data processing unit 14.

In the example being illustrated, the exchange is a private branch exchange and comprises a switch unit 15, a central control unit 16, a main memory 17, and an interface 18 between the exchange and the integrated services digital network 11. The interface 18 will presently be described.

The switch unit 15 is connected to the speech, the facsimile, and the data processing units 12, 13 and 14 and to the integrated services digital network 11 through the interface 18 and public lines 19. The central control unit 16 is connected to the switch unit 15 and the main memory 17.

The interface 18 comprises a signal channel and zeroth through twenty-second data channels as follows. The signal channel is generally named a D-channel in the art and is indicated in the figure by a reference symbol Dch. The signal channel is connected to the integrated services digital network 11 and the central control unit 16. Each of the zeroth through the twenty-second data channels is generally named a B-channel in the art and is connected to the integrated services digital network 11 and the switch unit 15. The zeroth through the twenty-second data channels are indicated by zeroth through twenty-second trunk numbers "2000" to "2022", respectively.

When communication is carried out in the communication system, an incoming call is sent from the integrated services digital network 11 to the central control unit 16 through the D-channel. The incoming call includes a channel datum, a kind datum, a number datum, and a message datum in the manner known in the art. Responsive to the incoming call, the central control unit 16 carries out a control operation which will later be described in detail. Each of the kind datum and the number datum is referred to as an additional datum.

The main memory 17 comprises primary and secondary memory areas 21 and 22 and a trunk number memory area 23 which are connected to the central control unit 16. The primary memory area 21 is for memorizing address data representative of slave addresses which are assigned to the incoming call. The secondary memory area 22 is for memorizing, as station data, extension number to be connected by the kind datum. The primary, the secondary, and the trunk number memory area 21, 22 and 23 memorize office data which are preassigned by a maintenance console 20. The trunk number memory 23 is for memorizing as the office data, the trunk numbers "2000" to "2022" according to channel numbers of the data channels.

Figure 2:
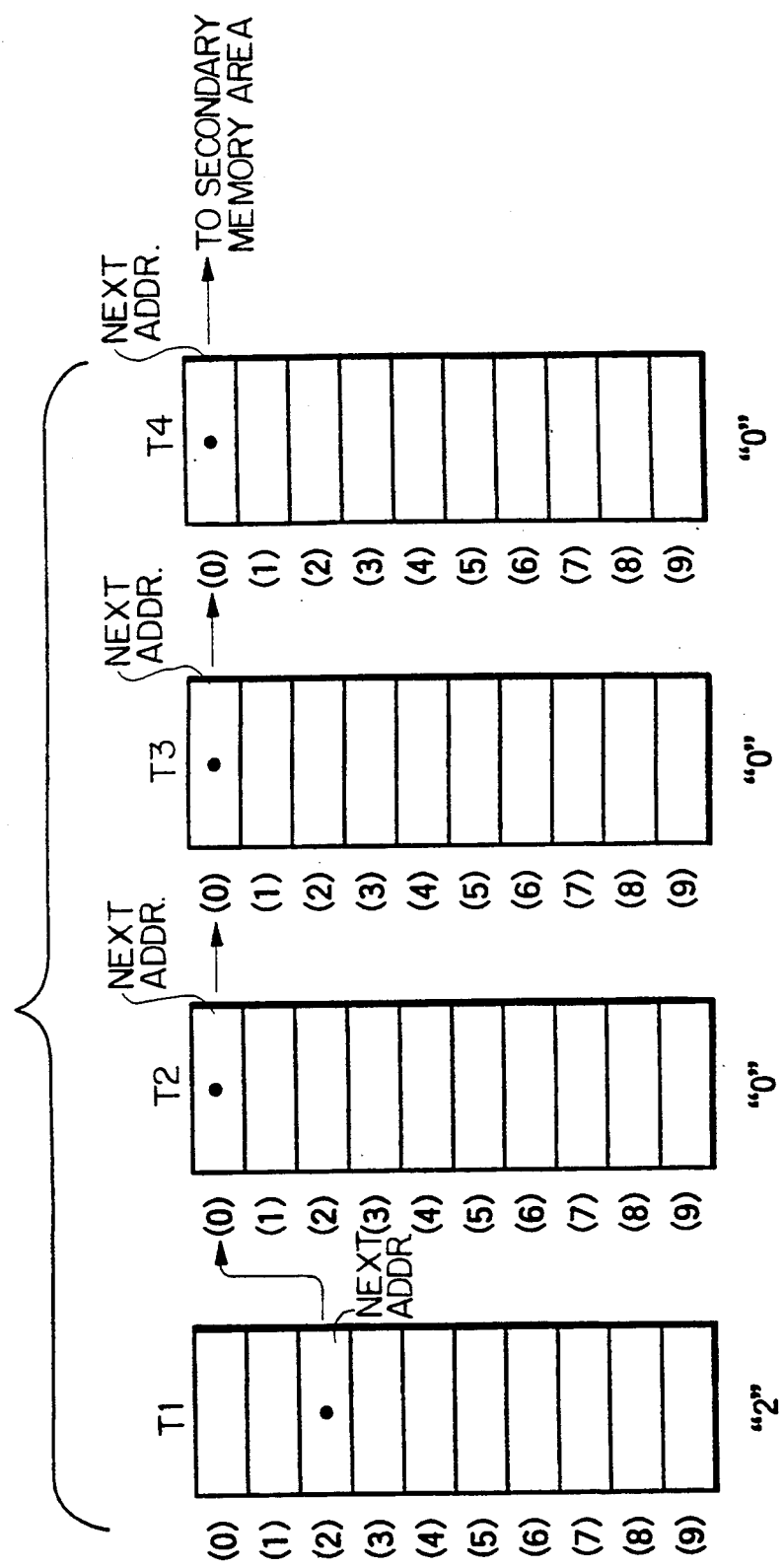
FIG. 2 shows a part of a memory area which is included in the exchange illustrated in FIG. 1 and is herein called a primary memory data merely for convenience of the description.

Referring to FIG. 2 with FIG. 1 additionally referred to, the description will proceed first to the primary memory area 21. It will be searched by the central control unit 16 that each trunk number is represented by four digits or a combination of the trunk number and a calling party by more than four digits. The primary memory area 21 comprises a first numeral table T1, a plurality of second numeral tables T2, a plurality of third numerals tables T3, and a plurality of fourth numeral tables T4 with a particular case illustrated in FIG. 2 for dealing with the zeroth trunk number "2000".

When the incoming call is sent from the network, the central control unit 16 carries out selection operation about the B-channel with reference to the channel datum that is included in the incoming call. When the B-channel is the zeroth data channel, the central control unit 16 gets the zeroth trunk number "2000" from trunk number memory area 23. The first numeral table T1 is searched by the central control unit 16 with reference to a first digit 2 of the zeroth trunk number, to get an address which represents one of the second numeral tables T2. Each of the second numeral tables T2 is searched, with reference to a second digital of the zeroth trunk number, an address which represents one of the third numeral tables T3. Each of the third numeral tables T3 is for designating, with reference to a third digit 0 of the zeroth trunk number, and get an address which represents one of the fourth numeral tables T4. Each of the fourth numeral tables T4 is searched, with reference to a fourth digit 0 of the zeroth trunk number, to get an address representing one of the secondary memory area 22 which will later be clear.

Each of the first through the fourth numeral tables T1 to T4 is divided into zeroth through ninth table sections (0) to (9) indicative of numerals 0 to 9 as follows. In the example being illustrated, the second table section (2) of the first numeral table T1 is given a top address of the next numeral table T2. This means that the numeral table T1 represents a selected one of the second numeral tables T2. In the selected one of the second numeral tables T2, the zeroth table section (0) is given a top address of the next numeral table T3. This means that the selected one of the numeral tables T2 represents a selected one of the third numeral tables T3. In the selected one of the third numeral tables T3, the zeroth table section (0) is given a top address of the next numeral table T4. This means that the selected one of the third numeral tables T3 represents a selected one of the fourth numeral tables T4. In the selected one of the fourth numeral tables T4 the second table section table section (2) is given a top address of the secondary memory area 22. This means that the selected one of the fourth numeral tables T4 represents a particular one of the address tables.

Thus, the particular address table is selected with reference to the zeroth trunk number "2000".

Figure 3:
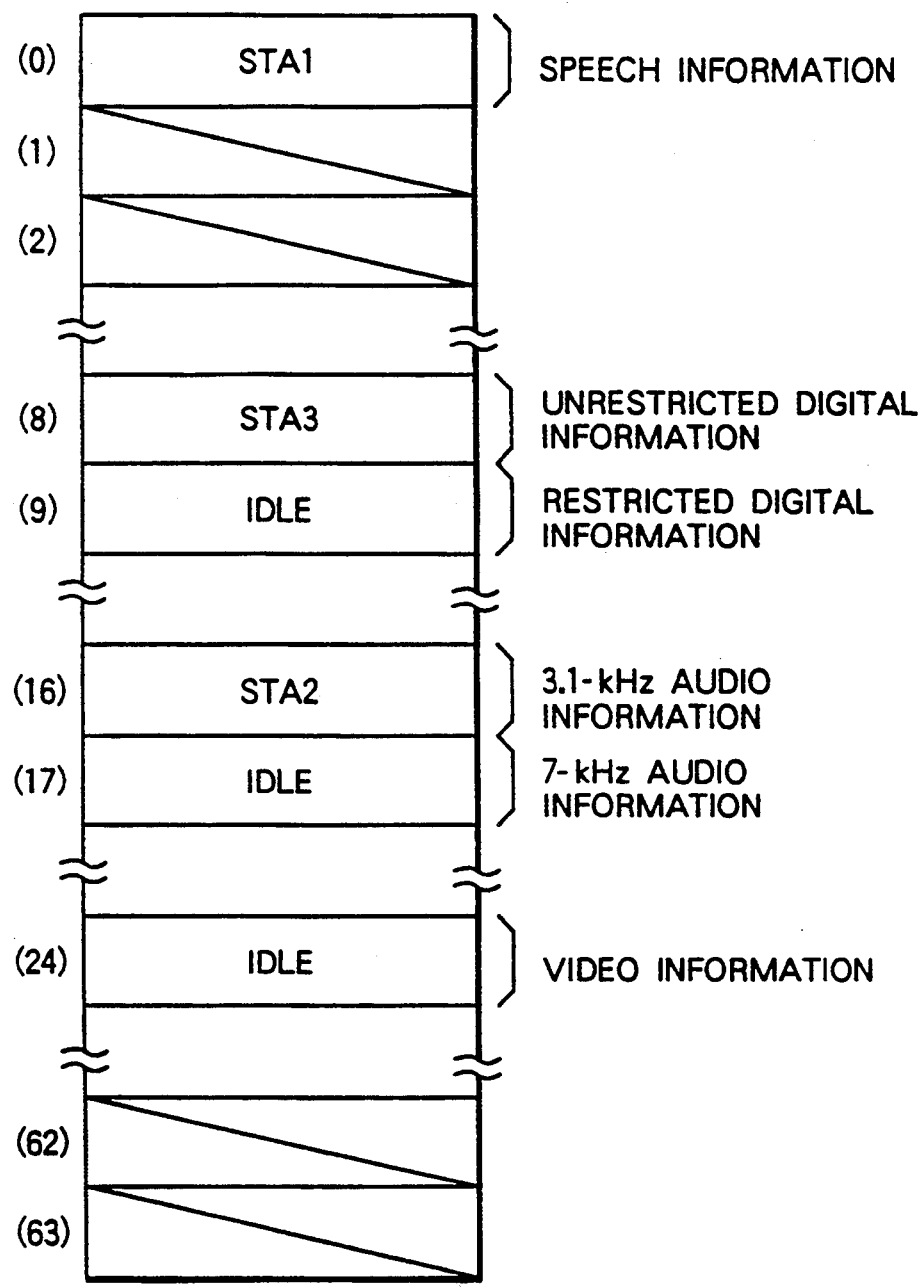
FIG. 3 shows a part of a secondary memory area in the exchange illustrated in FIG. 1.

Turning to FIG. 3 with FIG. 1 additionally referred to, the secondary memory area 22 will be described more in detail. The secondary memory area 22 represented from the primary memory area 21 comprises twenty-three tables which are assigned to the zeroth through the twenty-second trunk numbers "2000" to "2022", respectively. Only one of the tables is illustrated as the particular table in FIG. 3.

The particular table is assigned to the zeroth trunk number "2000" and is divided into zeroth through eighth, ninth through sixteenth, seventeenth through twenty-fourth, and twenty-fifth through sixty-third memory blocks (0) to (8), (9) to (16), (17) to (24), and (25) to (63) which are for memorizing the extension number to connect a terminal unit.

In the example being illustrated, the zeroth memory block (0) is assigned to speech information and memorizes, among the data, a particular datum STA1 which is indicative of the speech unit 12. The eighth memory block (8) is assigned to unrestricted digital information and memorizes, among the data, a specific datum ST3 which is indicative of the data processing unit 14. The ninth memory block (9) is reserved for restricted digital information and is idle in FIG. 3. The sixteenth memory block (16) is assigned to 3.1-kHz audio information and memorizes, among the data, an additional datum STA2 which is indicative of the facsimile unit 13. The seventeenth memory block (17) is reserved for 7-kHz audio information and is idle in FIG. 3. The twenty-fourth block (24) is reserved for video information and is idle in FIG. 3. In the manner indicated by each diagonal line, the first through the seventh memory blocks (1) to (7), the tenth through the fifteenth memory blocks (10) to (15), the eighteenth through the twenty-third memory blocks (16) to (23), and the twenty-fifth through the sixty-third memory blocks (25) to (63) are not assigned to particular information.

Continuing reference to FIGS. 1 and 3, the above-mentioned kind datum represents one of information transfer capability values. The description will shortly be made as regards relation between the information transfer capability values and the memory blocks. When the incoming call is sent from the network, the information transfer capability values are sent from the network to termination.

The various information transfer capability values are "0", "8", "9", "16", "17", and "24" and are determined for various kinds of information as follows. The value "0" represents the speech information. The value "8" represents the speech information. The value "8" represents the unrestricted digital information. The value "9" represents the restricted digital information. The value "16" represents the 3.1-kHz audio information. The value "17" represents the 7-kHz audio information. The value "24" represents the video information.

When the kind datum represents "0", the central control unit 16 checks the zeroth memory block (0). When the kind datum represents "8", the central control unit 16 checks the eight memory block (8). When the kind datum represents "9", the central control unit 16 checks the ninth memory block (9). When the kind datum represents "16", the central control unit 16 checks the sixteenth memory block (16). When the kind datum represents "17", the central control unit 16 checks the seventeenth memory block (17) When the kind datum represents "24", the central control unit 16 checks the twenty-fourth memory block (24).

Figure 4:
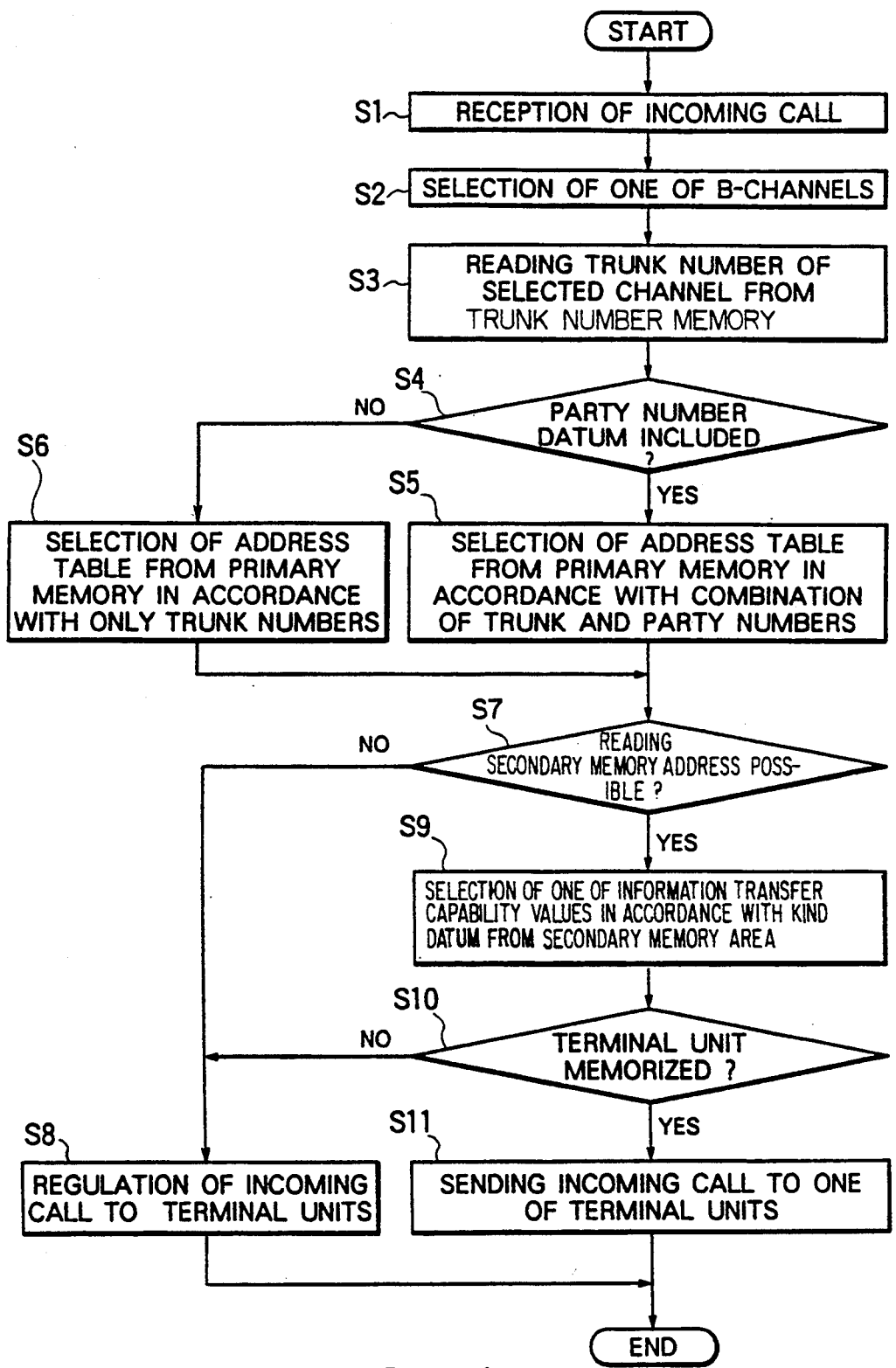
FIG. 4 is a flow chart for describing operation of a central control unit included in the exchange illustrated in FIG. 1.

Referring to FIG. 4 together with FIGS. 1 to 3, the description will proceed to operation of the exchange. At a first stage S1, the exchange is supplied with the incoming call. In this event, the channel datum of the incoming call is sent from the integrated services digital network 11 to the central control unit 16 through the signal channel Dch of the interface 18.

The first stage S1 is followed by a second stage S2 at which the central control unit 16 selects, as a selected channel, one of the zeroth through the twenty-second data channels of the trunk numbers "2000" to "2022" in the interface 18 with reference to the channel datum to transmit the incoming call from the integrated services digital network 11 through D channel. Herein, the central control unit 16 will be referred to as a selecting arrangement.

The description will proceed to a case where it is assumed that the selected channel is indicated by the zeroth trunk number "2000". The second stage S2 is followed by a third stage S3 at which the central control unit 16 reads the zeroth trunk number "2000" from the trunk number memory 23.

The third stage S3 is followed by a fourth stage S4 at which the central control unit 16 carries out judgement whether or not the incoming call comprises the number datum that is representative, as a party number datum, of a party number of a calling party. When the incoming call comprises the party number datum, the fourth stage S4 proceeds to a fifth stage S5 at which the central control unit 16 selects the particular address table from the primary memory 21 in accordance with a combination of the zeroth trunk number "2000" and the party number. In this event, the central control unit 16 produces a signal which is herein called a secondary signal merely for convenience of the description. A primary signal will later be described. Herein, the central control unit 16 will be referred to as a secondary producing arrangement.

In addition, the central control unit 16 processes at the fifth stage S5 the secondary signal into a local signal and will be referred to as a secondary processing arrangement. A combination of the secondary producing and the secondary signal processing arrangements is referred to a local signal producing arrangement.

When the incoming call does not comprise the party number datum at the fourth stage S4, a sixth stage S6 follows, at which the central control unit 16 selects the particular address table from the primary memory 21 in accordance with only the zeroth trunk number. In this event, the central control unit 16 produces an additional signal which will become clear as the description proceeds. The central control unit 16 will be referred to in this connection as an additional producing arrangement.

In addition, the central control unit 16 processes at the sixth stage S6 the additional signal into the local signal and will be referred to herein as an additional signal processing arrangement. A combination of the additional producing and the additional signal processing arrangements is referred to as the local signal producing arrangement.

The fifth and the sixth stages S5 and S6 are followed by a seventh stage S7 at which the central control unit 16 carries out judgement with reference to the particular table whether or not the address data are memorized in the particular table, namely, whether or not it is possible to read the address data. When it is impossible to read the address data, the seventh stage S7 proceeds to an eighth stage S8 at which the central control unit 16 regulates supply of the incoming call to the terminal units 12, 13, and 14. More particularly, the central control unit 16 makes the switch unit 15 control the incoming call so that the incoming call is sent to none of the speech, the facsimile, and the data processing units 12, 13, and 14. Otherwise, the seventh stage S7 proceeds to a ninth stage S9 at which the central control unit 16 selects, as a selected value, one of the information transfer capability values in accordance with the kind datum.

The ninth stage S9 is followed by a tenth stage S10 at which the central control unit 16 judges with reference to the selected value which of the terminal units 12, 13, and 14 is memorized in the particular table of the secondary memory area 22. Examples are as follows.

Attention will be directed to a particular case where it is assumed that the selected value is equal to "0". At the tenth stage S10, the central control unit 16 carries out judgement with reference to the selected value of "0" whether or not the particular datum ST1 is memorized in the zeroth block (0) of the particular table. When the particular datum ST1 is not memorized in the zeroth block (0), the tenth stage S10 proceeds to the eighth stage S8.

When the particular datum ST1 is memorized in the zeroth block (0), the tenth stage S10 proceeds to an eleventh stage S11 at which the central control unit 16 produces the primary signal in accordance with the kind datum and the particular datum ST1. Herein, the central control unit 16 will be referred to herein as a primary producing arrangement.

In addition, the central control unit 16 makes at the eleventh stage S11 the switch unit 15 control the incoming call so that the incoming call is sent to the speech unit 12. In this event, the central control unit 16 processes the primary signal into the local signal and will be referred to as a primary signal processing arrangement. A combination of the primary producing and the secondary signal processing arrangements is referred to as the local signal producing arrangement.

Consideration will be given to a specific case where the selected value is equal to "8". In this event, the incoming call is sent to the data processing unit 14. In an additional case where the selected value is equal to "16", the incoming call is sent to the facsimile unit 13.

At the second stage S2, the central control unit 16 may select as the selected channel, a different one of the zeroth through the twenty-second data channels with reference to the channel datum of the incoming call. The different data channel would have a different trunk number other than "2000". In this case, the central control unit 16 carries out a similar operation to make the switch unit 15 control the incoming call.

While the present invention has thus far been described in connection with the only one preferred embodiment thereof, it will now be readily possible for those skilled in the art to put this invention into practice in various other manners. For example, the interface 18 may comprise a signal channel and a single data channel in the manner known in the art.

What is claimed is:

1. An exchange between an integrated services digital network and a plurality of terminal units, including a control portion for controlling an incoming call which is transmitted from said integrated services digital network towards a particular one of said terminal units for carrying a selected one of various kinds of information, said incoming call including a message datum representative of a message and an additional datum added to said message datum for representing said selected one of the various kinds of the information, said exchange comprising:

a primary memory for memorizing address data representative of slave addresses in relation to said various kinds of the information, said slave addresses being assigned to respective said terminal units;

local signal producing means connected to said control portion and said primary memory and responsive to said incoming call for producing a local signal in accordance with said additional datum and said address data; and making means connected to said local signal producing means and said control portion for making said control portion control said incoming call in accordance with said local signal so that said incoming call is directed to said particular one of the terminal units.

2. The exchange as claimed in claim 1, said additional datum being a value determined for said selected one of the various kinds of the information, wherein said local signal producing means comprises:

primary producing means connected to said control portion and said primary memory for producing a primary signal in accordance with said value and said address data; and primary signal processing means connected to said primary producing means and said making means for processing said primary signal into said local signal.

3. The exchange as claimed in claim 1, wherein said control portion comprises a switch unit connected to said terminal units and said integrated services digital network, wherein said incoming call includes a channel datum, and wherein said exchange comprises selecting means connected to said switch unit for selecting said particular one from said terminal units with reference to said channel datum to thereby transmit said incoming call from said integrated services digital network to said particular one of the terminal units.

4. The exchange as claimed in claim 3, wherein said integrated services digital network comprises a plurality of B-channels connected to said switch unit, and wherein said local signal producing means comprises:

a secondary memory for memorizing trunk numbers representative of said B-channels;

secondary producing means connected to said switch unit and said secondary memory for producing a secondary signal in accordance with said channel datum and said trunk numbers; and secondary signal processing means connected to said secondary producing means and said making means for processing said secondary signal into said local signal.

5. The exchange as claimed in claim 3, wherein said integrated services digital network comprises a plurality of B-channels connected to said switch unit, wherein said incoming call includes a number datum representative of a party number indicative of a calling party, and wherein said exchange comprises:

a secondary memory for memorizing trunk numbers representative of said B-channels;

additional producing means connected to said switch unit and said secondary memory for producing an additional signal in accordance with said channel datum, said trunk numbers, and said number datum; and additional signal processing means connected to said additional producing means and said making means for processing said additional signal into said local signal.

* * * * *